United States Patent
Dietsch et al.

(10) Patent No.: US 6,623,034 B2
(45) Date of Patent: Sep. 23, 2003

(54) AIRBAG HAVING CHAOTIC FOLDS AND AIRBAG MODULE WITH THE SAME

(75) Inventors: Andrea Dietsch, Schornsheim (DE); Gerd Radtke, Berlin (DE); Falk Ose, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/741,519

(22) Filed: Dec. 19, 2000

(65) Prior Publication Data

US 2001/0002750 A1 Jun. 7, 2001

Related U.S. Application Data

(63) Continuation of application No. 09/194,373, filed as application No. PCT/DE97/00918 on May 2, 1997, now Pat. No. 6,250,675.

(30) Foreign Application Priority Data

May 28, 1996 (DE) .......................... 196 23 041

(51) Int. Cl.[7] .............................................. B60R 21/16
(52) U.S. Cl. ..................................... 280/743.1; 493/405
(58) Field of Search .................... 280/743.1, 728.1; 53/429, 117, 120; 493/405, 407, 449, 464, 437

(56) References Cited

U.S. PATENT DOCUMENTS

| 3,843,152 | A | 10/1974 | Nonaka ...................... 380/150 |
| 3,876,272 | A | 4/1975 | Tsutsumi et al. ............... 339/3 |
| 3,907,330 | A | 9/1975 | Kondo et al. ................. 280/150 |
| 4,173,356 | A | 11/1979 | Ross .......................... 280/743 |
| 4,178,344 | A | 12/1979 | Smith et al. ................. 264/572 |
| 4,235,453 | A | 11/1980 | Lawson et al. .............. 280/743 |
| 4,351,544 | A | 9/1982 | Ross .......................... 280/743 |
| 4,718,884 | A | 1/1988 | Iwase et al. ................. 493/419 |
| 4,842,300 | A | 6/1989 | Ziomek et al. .............. 280/732 |
| 4,903,986 | A | 2/1990 | Cok et al. .................... 280/473 |
| 4,936,819 | A | 6/1990 | Sundberg .................... 493/451 |
| 5,114,180 | A | 5/1992 | Kami et al. ................. 280/743 |
| 5,140,799 | A | 8/1992 | Satoh .......................... 53/429 |
| 5,162,035 | A | 11/1992 | Baker ........................ 493/405 |
| 5,163,893 | A | 11/1992 | Hara et al. .................. 493/458 |
| 5,178,407 | A | 1/1993 | Kelley ........................ 280/728 |
| 5,300,011 | A | 4/1994 | Budde et al. ................ 493/405 |
| 5,360,387 | A | 11/1994 | Baker ......................... 493/485 |
| 5,391,137 | A | 2/1995 | DePoy et al. ................ 493/405 |
| 5,413,376 | A | 5/1995 | Filion et al. ................. 280/728 |
| 5,456,651 | A | 10/1995 | Baker et al. ................. 493/405 |
| 5,482,317 | A | 1/1996 | Nelsen et al. ............... 280/743 |
| 5,493,846 | A | 2/1996 | Baker et al. .................. 53/429 |
| 5,531,476 | A | 7/1996 | Kerner ........................ 280/743 |
| 5,568,938 | A | * 10/1996 | Lindstrom ........... 280/743.1 X |
| 5,669,204 | A | 9/1997 | Blaisdell .................... 493/405 |

(List continued on next page.)

FOREIGN PATENT DOCUMENTS

| DE | 2524770 | 12/1976 |
| DE | 4138645 | 6/1992 |
| DE | 4227559 A1 | 1/1994 |

(List continued on next page.)

OTHER PUBLICATIONS

Airbags Are Everywhere: How Are They Doing?., Carl E. Nash, Ph.D, 2nd *International Akzo Symposium On Occupatent Restraint Systems*, pp. 84–93, Mar. 25–27, 1992.

(List continued on next page.)

*Primary Examiner*—Brian L. Johnson
*Assistant Examiner*—Bryan Fischmann
(74) *Attorney, Agent, or Firm*—Foley & Lardner

(57) ABSTRACT

An airbag for an airbag module wherein, in the folded state, the airbag has at least one constriction and folds extending in an ordered and/or chaotic manner. Preferably, the constriction extends from the top of the airbag to the bottom and perpendicular to the plane of the expanded unfolded airbag.

7 Claims, 7 Drawing Sheets

U.S. PATENT DOCUMENTS

| | | | |
|---|---|---|---|
| 5,690,358 A | 11/1997 | Marotzke | 280/743 |
| 5,755,078 A | 5/1998 | Hurtig, Jr. et al. | |
| 5,772,239 A | 6/1998 | Seymour | 280/728.3 |
| 5,803,892 A * | 9/1998 | Marotzke | |
| 5,960,611 A * | 10/1999 | Aigner et al. | 53/429 |
| 5,984,852 A * | 11/1999 | Heudorfer et al. | 280/728.1 X |
| 6,115,998 A * | 9/2000 | Reh et al. | 53/429 |
| 6,152,867 A * | 11/2000 | Heudorfer et al. | 493/405 X |
| 6,171,228 B1 * | 1/2001 | Marotzke et al. | 493/405 |
| 6,224,100 B1 * | 5/2001 | Kamano et al. | 280/743.1 |
| 6,248,052 B1 * | 6/2001 | Kleeberger et al. | 493/405 X |
| 6,250,675 B1 * | 6/2001 | Dietsch et al. | 280/743.1 |
| 6,406,061 B1 * | 6/2002 | Nishijima | 280/743.1 |
| 6,505,855 B2 * | 1/2003 | Nishijima et al. | 280/743.1 |

FOREIGN PATENT DOCUMENTS

| | | | |
|---|---|---|---|
| DE | 4343026 | | 6/1994 |
| DE | 4422276 | | 12/1994 |
| DE | 195 16 494 | | 2/1995 |
| DE | 195 02 744 | | 3/1996 |
| DE | 195116494 | | 10/1996 |
| DE | 19535564 | * | 3/1997 |
| EP | 0478897 | | 4/1992 |
| EP | 0614786 | | 9/1994 |
| EP | 0619204 | | 10/1994 |
| EP | 0691245 | | 1/1996 |
| EP | 8729396 | | 10/1997 |
| EP | 829396 | * | 3/1998 |
| EP | 839691 | * | 5/1998 |
| GB | 2192841 | | 1/1988 |
| GB | 2311043 | | 9/1997 |
| JP | 51-68043 | * | 6/1976 |
| JP | 5214497 | | 4/1977 |
| JP | 5326888 | | 8/1978 |
| JP | 53-26889 | * | 8/1978 |
| JP | 53-36888 | * | 8/1978 |
| JP | 5849541 | | 3/1983 |
| JP | 2279442 | | 11/1990 |
| JP | 5-852292 | | 5/1993 |
| JP | 40802659 | | 1/1996 |
| JP | 410324211 | | 12/1998 |
| WO | WO96/33886 | | 10/1996 |
| WO | 96/24781 | * | 11/1996 |
| WO | WO96/34781 | | 11/1996 |
| WO | WO97/10124 | | 3/1997 |
| WO | WO97/12782 | | 4/1997 |
| WO | WO97/28024 | | 8/1997 |
| WO | WO97/35745 | | 10/1997 |
| WO | WO97/45296 | | 12/1997 |
| WO | WO97/48580 | | 12/1997 |
| WO | 98/22311 | * | 5/1998 |

OTHER PUBLICATIONS

PAM–SAFE, Seminar Notes by Engineering Systems International, Jul. 1990, 8 pp.

"Neue Methoden Und Neue Ziele Bei Der Entwicklung Von Inasses Schutzsystemem/New Methodology and New Target in Development of Occupant Protection Systems", Adomeit, *ATZ Automobiltechnische Zeitschrift* Bd. 97, Nr. 07/08 pp. 456–462.

*Patent Abstracts of Japan*, Publication No. 0327905t3, Dec. 10, 1991, 1 pp.

* cited by examiner

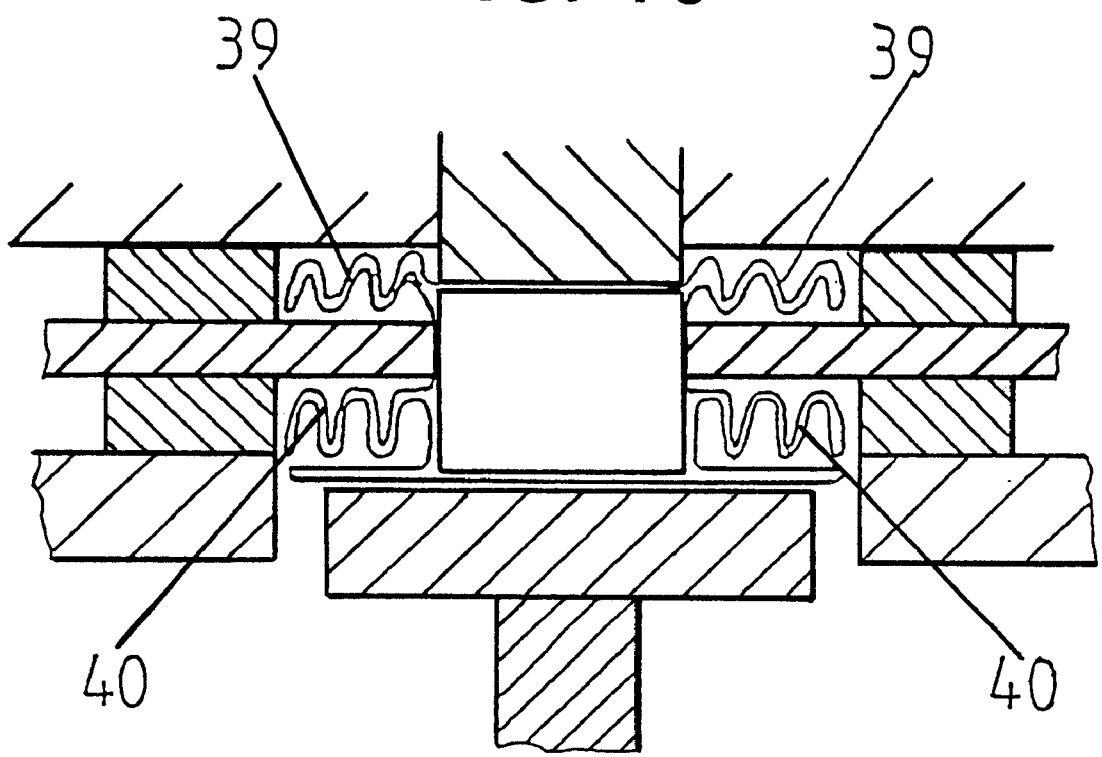

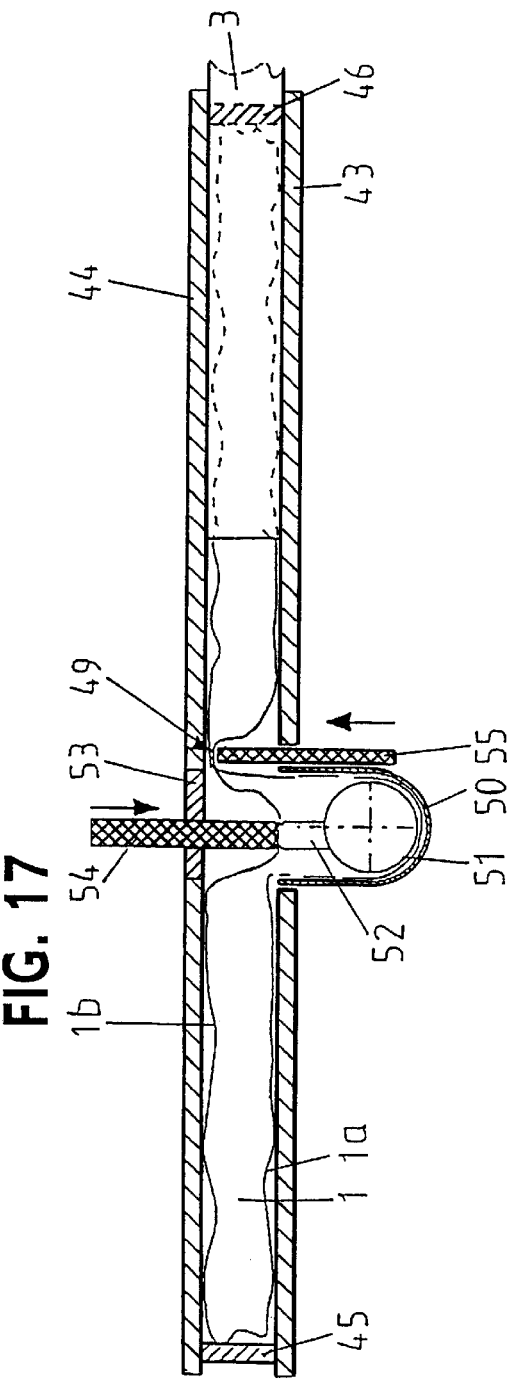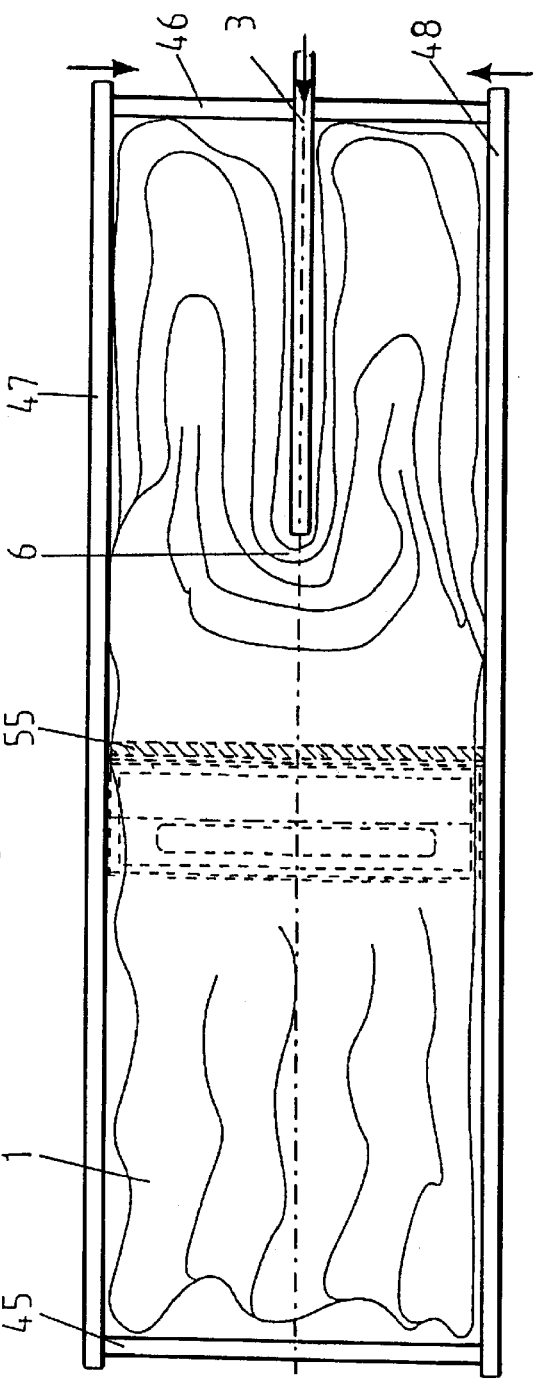

AIRBAG HAVING CHAOTIC FOLDS AND AIRBAG MODULE WITH THE SAME

This application is a continuation of application Ser. No. 09/194,373 filed Mar. 10, 1999 (now U.S. Pat. No. 6,250,675), which is a national stage application of PCT/DE97/00918 filed May 2, 1997.

FIELD OF THE INVENTION

The invention relates to an airbag, a method for folding same and a device for carrying out the method.

BACKGROUND OF THE INVENTION

In order to be able to store an airbag in an airbag module, it is known to fold the airbag into a correspondingly small packet. Different types of folding are known. Thus, from U.S. Pat. No. 4,173,356, different types of straight line folding are known, wherein the folds run in rays from a center towards the outside or approximately parallel to each other. The drawback with these folds is that they have to be collapsed at least when used in a driver airbag module so that during unfolding of an airbag of this kind, the internal pressure produced in partial areas of the airbag impede the opening of some folds. Furthermore, the expense of folding is considerable.

German Patent publication DE 44 22 276 A1 discloses an airbag for an airbag module having main folds that run at least in part along closed tracks round an imaginary center on the substantially empty spread-out airbag. The closed main folds describe preferably circular paths or ellipses of slight eccentricity.

This path for the main folds has the advantage that the folded airbag can open very rapidly and easily. More particularly during the unfolding of such an airbag there is not the danger that the internal pressure produced in partial areas of the airbag will prevent the opening of further folds. This airbag can thereby be used for driver, passenger and side airbags. The drawback with this folding is that the expense for mechanical folding is high.

SUMMARY OF THE INVENTION

The object of the present invention is to fold the airbag so that on the one hand it can be easily and completely unfolded and on the other the expense of folding the airbag is reduced.

According to the invention, the airbag has in the folded position at least one continuous constriction as well as ordered and/or chaotic folds. More particularly, it is proposed that the folds in the areas of the airbag divided by the constriction run separated without overlapping the constriction. In the case of an airbag with a top and bottom side, the constriction extends from the top side to the bottom side of the airbag. More particularly, the constriction extends in one embodiment at right angles to the plane of the spread-out unfolded airbag through same.

The advantage of this constriction is that it has a positive effect particularly on the chaotic folding. The drawback of chaotic folding, where the unfolding of the airbag is impeded in the areas where the airbag overlap, is substantially avoided by the provision of at least one constriction. Furthermore, there is the advantage that for different shapes of airbag modules, through one or more constrictions, it is possible to spread out the folds to match the different shapes. The space available for the folded airbag can be utilized in an optimum manner.

Depending on the selected form of the spread-out airbag, it can be expedient to provide one, two or more constrictions in the airbag. The airbag for a driver airbag module preferably has four constrictions.

In a further embodiment, at least one constriction is provided which runs between the upper side and the lower side of the airbag. With this embodiment owing to this constriction, the upper and lower parts of the airbag are separated at least in part, and both parts also have separate folds. With this embodiment, the fact that the folds of the upper part do not project into the folds of the lower part has a particularly advantageous effect on the all-round rapid unfolding of the airbag. Furthermore, with the constriction, the outer areas of the airbag are moved inwards close to the gas generator or diffuser. Thus, during unfolding of the airbag, apart from the accelerated expansion in the main unfolding direction, an expansion at right angles thereto is also achieved. By selecting the arrangement, number and depth of the constrictions it is possible to accurately control the unfolding in certain directions.

One method for folding an airbag is characterized according to the invention in that the spread-out airbag is constricted at least once continuously on at least one side and that it is then folded and/or compressed to the extent required for stowage in the airbag module.

It is expedient if the airbag is folded separately in areas which are separated by a constriction.

In a first embodiment in the case of an airbag which has an upper side and a lower side, the airbag is constricted from the upper to the lower side.

The constriction carried out in the first stage represents a pre-folding for the following orderly or chaotic folding. These method steps allow a simple mechanical conversion since the production of a constriction and the compression of the thus pre-folded airbag are simple procedures.

The airbag is preferably constricted at right angles to the plane of the spread-out airbag. However constrictions deviating from the perpendicular are also possible to obtain the advantages.

The airbag is constricted on one side or on several sides. The airbag for a passenger airbag module is preferably constricted from one side. The spread-out airbag, which is only provided with the one constriction, has prior to compression the shape of a human molar tooth with two roots.

The airbag for a driver airbag module is preferably constricted on four sides, preferably simultaneously. The spread-out airbag, which is only provided with the four constrictions, has prior to compression the shape of a four-leaved clover.

During folding and compression of the airbag, the constrictions previously provided have the effect that the ordered and/or chaotic folds produced are each only formed inside the area defined by the constrictions, i.e. the folds do not overlap the constrictions. Overlapping of in particular the chaotic folds is thereby substantially avoided. The constrictions are also obtained after the chaotic folding.

In a further embodiment it is proposed that the airbag is constricted between its upper and lower side and that then both sides are folded and/or compressed separately.

A device for folding an airbag is characterized according to the invention in that one tool each is provided for producing each constriction, that the spread-out airbag and the tool can be moved relative to each other in the plane of the spread-out airbag and that folding tools and/or slider-like tools for compressing the airbag to the storage size are provided above and/or at the side of the spread-out airbag.

In one embodiment it is proposed that the tool for producing a constriction extends perpendicular to the plane of the spread-out airbag. The tool preferably extends at least over the height of the airbag in its folded position.

In a further embodiment it is proposed that the tool for producing a constriction extends parallel to the plane of the spread-out airbag. In this embodiment the width of the tool is preferably less than the largest width measurement of the spread-out airbag.

A sword-like tool can advantageously be provided for producing the constriction. This tool has at least a height corresponding to the proposed height of the folded airbag so that the airbag is constricted over the entire height when sliding the tool sideways into the airbag.

In a further embodiment a wire-like tool is provided for producing the constriction and extends substantially at right angles to the spread-out airbag.

In preferred embodiments it is proposed that one sword-like or wire-like tool each is provided for producing each one constriction.

It is expedient for the prefolding of an airbag for a passenger airbag module to provide a tool so that a constriction is produced during its operation. For prefolding an airbag for a driver airbag module it is expedient to provide four tools so that when operated four constrictions are produced.

These sword or wire like tools as well as the slider-like tools for compressing the airbag are to be operated mechanically and simply in any known way whereby a high processing reliability is achieved.

A further design of the tool is characterized in that a space is provided for folding the airbag between a lower cover plate and an upper cover plate of which one is movable, that the sword-like tool runs between the cover plates and at right angles to same, that the space for folding the airbag is restricted at the side by sliders which are displaceable between the cover plates, that in the lower cover plate an opening is provided for an airbag housing and next to this at least one slider is provided which can be moved at right angles relative to the cover plates, and that in the upper cover plate in the area of the airbag housing an opening is provided in which a removable packing ram is mounted which can be moved at right angles to the cover plates and contains a place holder which can be moved perpendicular to the cover plates.

The place holder has, at right angles to the direction of movement, roughly the cross-sectional shape of a flue of a diffuser inserted in the airbag housing.

The invention will now be explained in further detail with reference to the embodiments shown in the drawings.

BRIEF DESCRIPTION OF THE DRAWINGS

FIG. 16 shows the tool according to FIG. 15 with folded airbag;

FIG. 17 is a sectional view through a further embodiment of a tool;

FIG. 18 is a plan view of the tool according to FIG. 17;

DETAILED DESCRIPTION OF THE INVENTION

Figure 1:
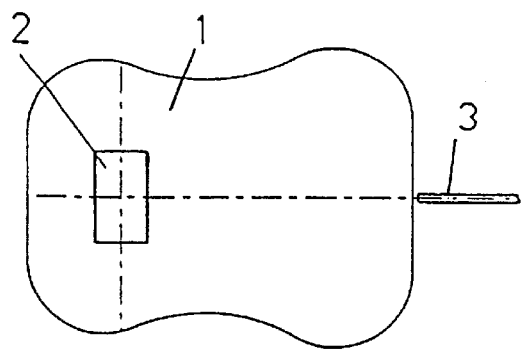
FIG. 1 is a view from below of a spread-out airbag for a passenger airbag module and an associated sword-like tool.
Figure 3:
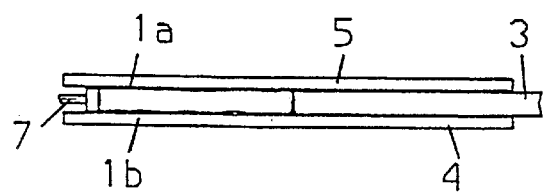
FIG. 3 shows a sectional view through FIG. 2 according to the line III—III.

FIG. 1 shows a spread-out airbag 1 which has a blow-in mouth 2 for a tubular gas generator. In the event that the tubular gas generator is mounted in the airbag it should be fitted prior to the folding process. A sword-like tool 3 is associated with the spread-out airbag. The spread-out airbag lies on a backing support 4 and is covered at the top by a vertically adjustable cover 5 (FIG. 3). The distance between the backing support and the cover thereby corresponds to the desired height of the folded airbag. In the embodiment the top side 1b lies on the backing support 4 and the lower side 1a with the blow-in mouth 2 lies on the top.

Figure 2:
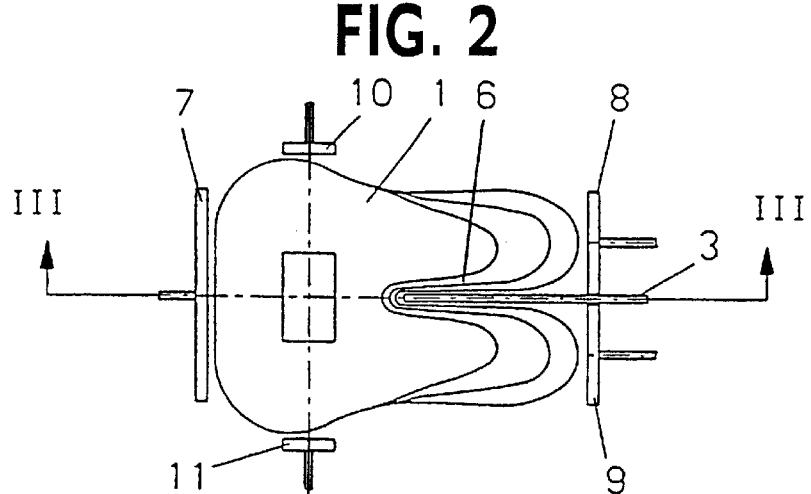
FIG. 2 shows the airbag according to FIG. 1 with a constriction and the associated tools for compressing the airbag.

Before the folding proceeds, the airbag is spread out over the backing support and stretched smooth. The cover 5 is then brought to the required distance against the backing support. The first and substantially new step of the folding processes now consists in moving the sword-like tool 3 between the backing support 4 and the cover 5 towards the airbag 1. By means of this tool a constriction 6 is produced as shown in FIG. 2. The airbag then has the shape shown in FIG. 2 of a tooth with two roots. The constriction represents a pre-orientation for the following chaotic folding of the airbag. To this end the airbag is compressed following the creation of the constriction by means of the sliders 7 to 11. In the present embodiment the airbag is first compressed by the sliders 7, 8 and 9 in one direction and then compressed to the required size by the sliders 10 and 11 at right angles thereto.

Figure 4:
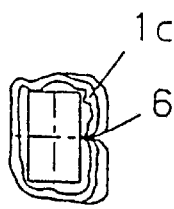
FIG. 4 shows the folded airbag.

After the compression, the chaotically folded airbag has the shape shown in FIG. 4. It can be seen that the constriction 6 remains set during the compression and at the end of compression so that separate folded areas with chaotic folds 1c are produced. The danger of parts of the airbag overlapping one another during compression is thereby substantially reduced.

Figure 5:
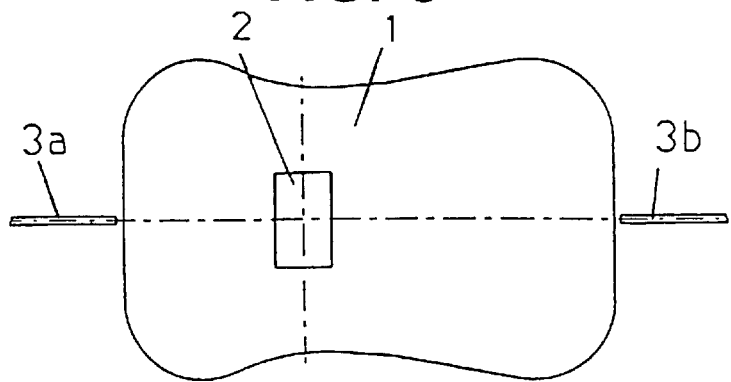
FIG. 5 shows a view from below of a spread-out airbag for a passenger airbag module with two associated sword-like tools.
Figure 6:
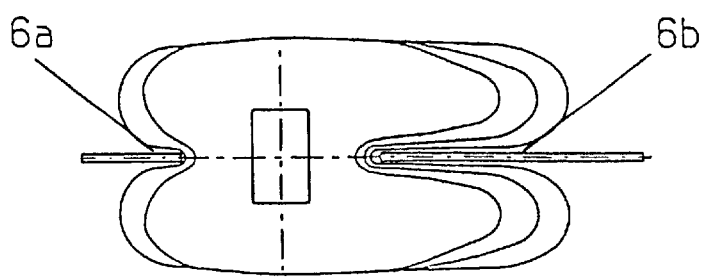
FIG. 6 shows the airbag according to FIG. 5 with constrictions.

FIGS. 5 and 6 show the production of two constrictions 6a and 6b by means of two sword-like tools 3a and 3b. After their action on the airbag, the airbag has the shape shown in FIG. 6 with constrictions on two sides.

Figure 7:
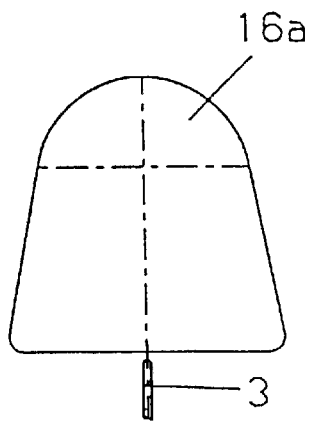
FIG. 7 is a plan view of the airbag for a driver airbag module with an associated sword-like tool.
Figure 8:
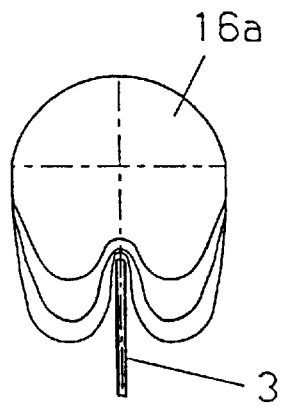
FIG. 8 shows the airbag according to FIG. 7 with constriction.

FIG. 7 shows an airbag 16a spread out for a driver airbag module which is folded on one side in the shape shown in FIG. 8 by means of a sword-like tool 3.

Figure 9:
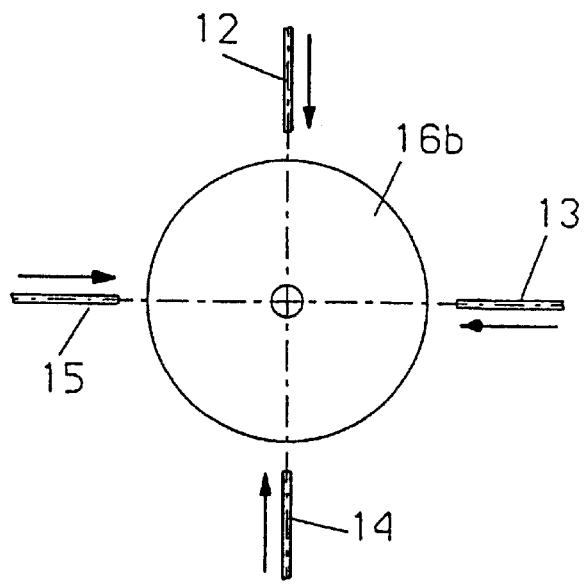
FIG. 9 is a view from below of a spread-out airbag for a driver airbag module with associated sword-like tools.
Figure 10:
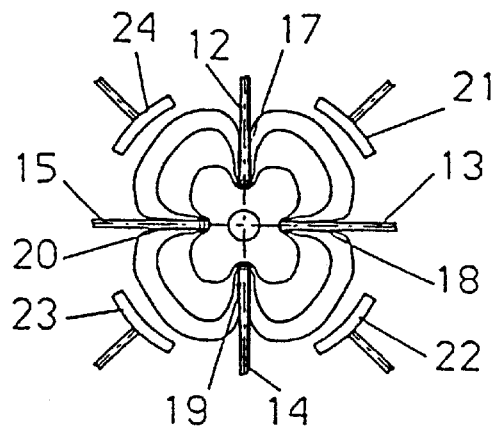
FIG. 10 shows the airbag according to FIG. 9 with constrictions and the tools for the compression of the airbag.
Figure 11:
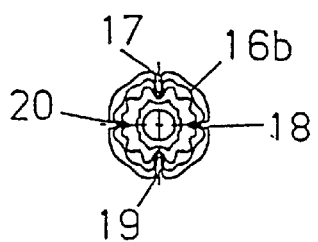
FIG. 11 shows the folded airbag according to FIG. 9.

FIGS. 9 to 11 show how an airbag 16b is pre-folded by means of four sword-like tools 12 to 15. As with the previous embodiments, the airbag 16b is spread out on a backing support (not shown) and covered by a cover at the required distance from the backing support. Constrictions 17 to 20 are then formed in the airbag by means of the sword-like tools. The airbag then has the shape shown in FIG. 10 of a four-leaf clover. The airbag is then compressed by means of the sliders 21 to 24 i.e., a chaotic folding is achieved.

After compression, the airbag has the shape shown in FIG. 11. It can be seen that even in this case after folding, the constrictions 17 to 20 are present. Through the division of the airbag into four partial areas by means of the constrictions, the risk of overlapping of the folds during compression is substantially reduced.

Figure 12:
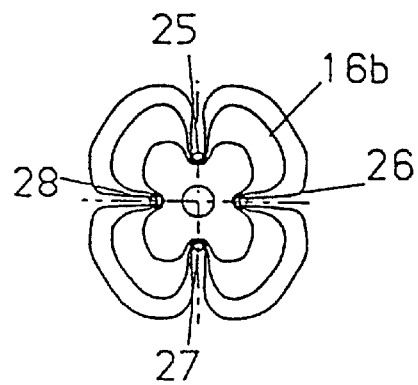
FIG. 12 is a view from below of a spread-out airbag with constrictions and associated wire-like tools for producing the constrictions.

In the embodiment of FIG. 12 wire-like tools 25 to 28 are provided for producing the constrictions in place of the sword-like tools. These wire like tools are shown in section in FIG. 12 and extend through slits in the backing support (not shown) and in the cover (not shown) and are displaced relative to the airbag by a drive which is known per se and is not shown. The compression of the airbag to the size required for storage in the airbag module is carried out as shown with the embodiment in FIGS. 9 to 11.

Figure 13:
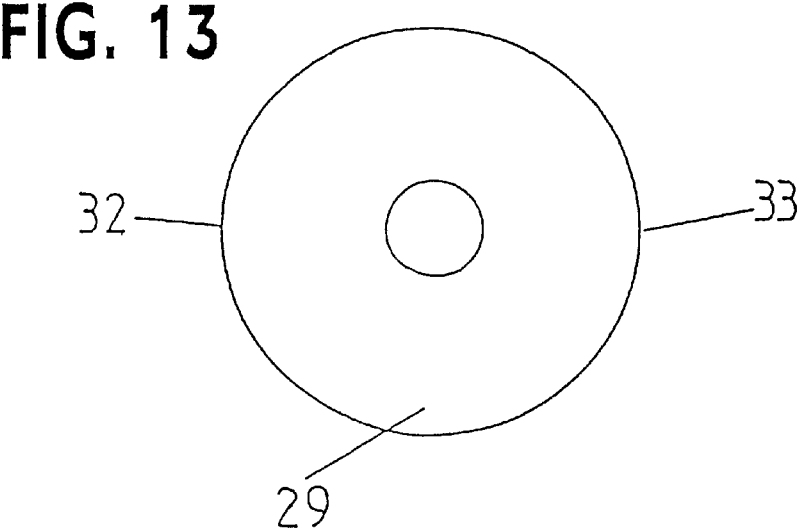
FIG. 13 is a view from below of the spread-out circular airbag.
Figure 14:
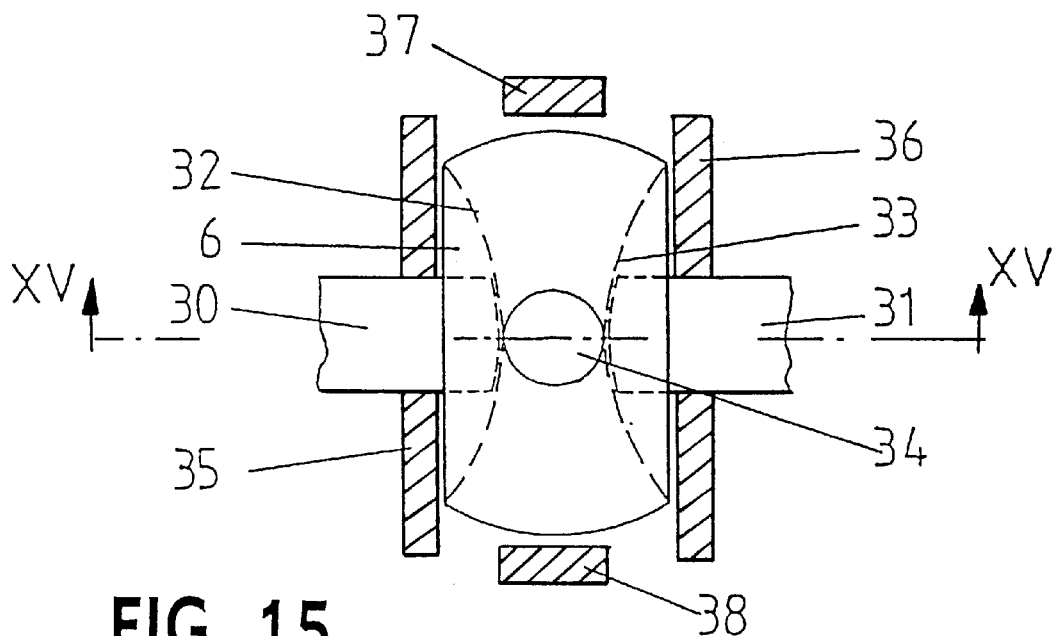
FIG. 14 is a plan view of a tool, partially cut away for constricting the airbag parallel to the plane of the spread-out airbag.

In FIG. 13, an airbag 29 is shown in the spread-out position which is to be constricted parallel to the expansion plane and then gathered together. As can be seen from FIG. 14, two slider-like tools 30, 31 are provided by means of which the outer areas 32, 33 of the airbag 29 are constricted to a gas generator 34 so that they have the position shown in FIG. 14. Gathering sliders 35 to 38 can be seen in this FIG.

Figure 15:
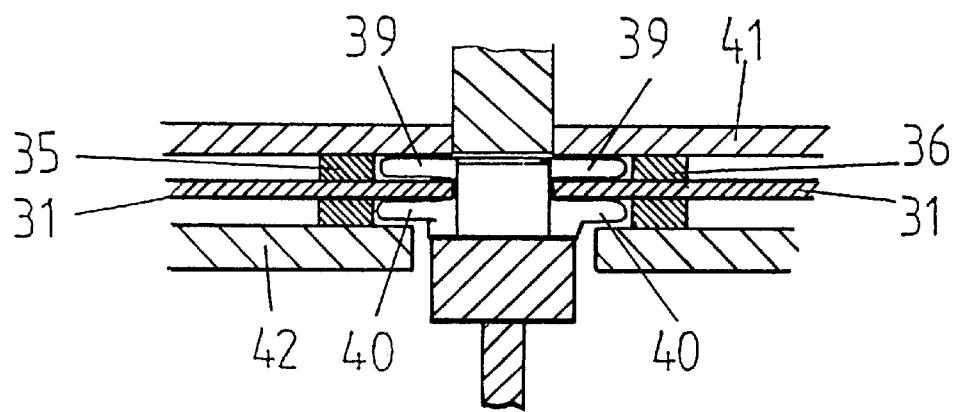
FIG. 15 is a sectional view through the tool taken along line XV—XV of FIG. 14.

As can be seen from FIG. 15, the airbag has in the area of the constrictions upper parts 39 and lower parts 40 which are then folded chaotically by means of the gathering sliders 35 to 38 which are restricted top and bottom by cover plates 41, 42 wherein at least one cover plate should be movable for opening the folding space.

It can be seen from FIG. 16 that a separate folding of the upper parts 39 and lower parts 40 is carried out by the gathering elements whereby the advantages mentioned above are produced.

FIG. 17 shows a section through a tool which as in the embodiment of FIG. 1 has a sword-like tool 3. This is guided between a lower cover plate 43 and an upper cover plate 44 and runs perpendicular to same. In the lower cover plate 43 is a cut out section for holding a housing 50 in which the airbag having the diffuser 51 can be inserted. The diffuser has a flue 52 which has outlet openings (not shown) for the gas emerging from the gas generator. The gas generator is fixed in the diffuser before or after folding the airbag. A packing ram 53 is positioned in the cut out section in the upper cover plate 44 and a place holder 54 is guided in the packing ram whereby the cross-section of the place holder corresponds in the direction of movement to the cross-section of the flue 52. As can be seen in FIG. 17, the place holder 54 lies on the flue 52 whereby only the top side 1b of the airbag 1 is fixed between the two, and the space above the flue is kept free during the entire folding process so that the top side in the area of the flue 52 runs separately from the lower side 1a. The separate path is ensured on the side of the flue 52 by a slider 55 which prevents the top and bottom sides from overlapping when folding the airbag.

The space between the cover plates is restricted at the side by sliders 45 to 48. In FIGS. 17 and 18, the airbag 1 is shown already partially folded whereby a constriction 6 is produced by the sword-like tool 3 and the airbag has been brought by the sliders 47, 48 to the width required for storage.

Figure 19:
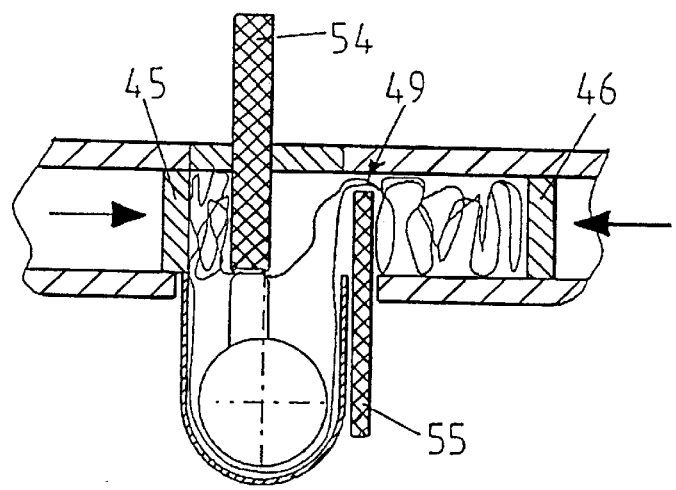
FIGS. 19–21 show the tool according to FIG. 17 in successive stages of the airbag folding.

After the airbag has been prefolded in the manner shown in FIGS. 17 and 18 it is further gathered by means of the sliders 45 and 46. In FIG. 19, the slider 45 is shown in its end position. The left of the airbag is folded completely chaotically. The slider 46 has reached its intermediate position and thereby the right airbag part is prefolded chaotically. A fold 49 defined by the slider 55 thereby remains set.

Figure 20:
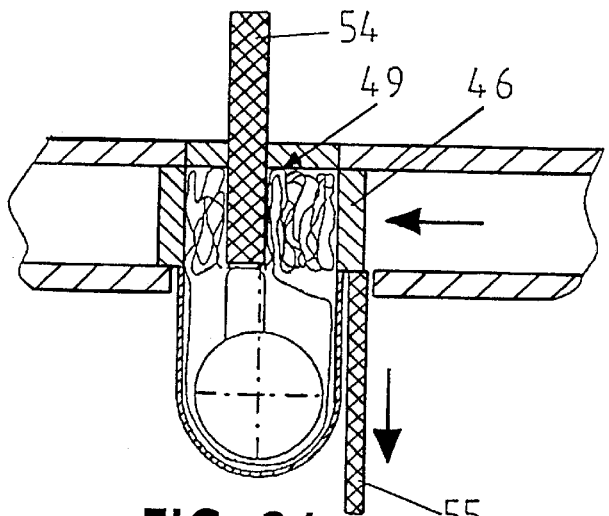

For the further folding process, the slider 55 is drawn back from the space between the cover plates 43 and 44 and the slider 46 is brought into its end position as shown in FIG. 20. Also in this folding state, the fold 49 remains and thus the separate position of the lower part 1a and upper part 1b remains between the place holder and the flue on one side and the fold 49 on the other.

Figure 21:
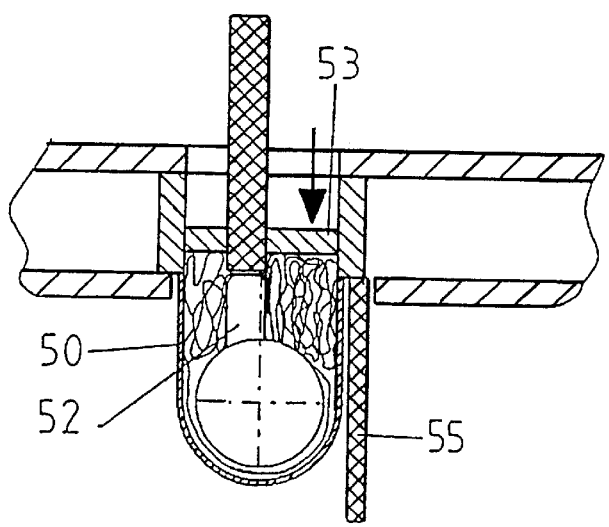

At the end of the gathering process, the gathered airbag is pressed by the packing ram 53 past the flue 52 into the housing 50 as shown in FIG. 21.

With this embodiment of the tool, apart from a separate folding by using the sword-like tool, it happens that in the area of the diffuser and more particularly in the area of the outlet openings provided there, the upper and lower parts of the airbag do not overlap. The opening behavior of the airbag is thereby subjected to an additional positive influence.

What is claimed is:

1. An airbag for an airbag module wherein the airbag, in a folded position, has a continuous constriction and ordered and chaotic folds, and wherein the constriction extends into the airbag along a length and through the airbag perpendicularly to the plane of the spread-out unfolded airbag to thereby divide the airbag into folded portions and wherein the folded portions of the airbag are in contact with each other along the length of the constriction.

2. An airbag according to claim 1, wherein the constriction extends from a top side to a bottom side of the airbag.

3. An airbag according to claim 2, wherein the airbag has only one construction.

4. An airbag according to claim 2, wherein the airbag has two or more constrictions.

5. An airbag according to claim 1, wherein the airbag has only one constriction.

6. An airbag according to claim 1, wherein the airbag has two or more constrictions.

7. An airbag for an airbag arrangement wherein the airbag, in a folded position, has at least one continuous constriction and chaotic folds, and wherein the constriction extends into the airbag along a length and through the airbag perpendicularly to the plane of the spread-out unfolded airbag wherein the airbag is divided into partial areas separated by the at least one continuous constriction and wherein the areas divided by the at least one constriction are in contact along the length of the constriction.

* * * * *